United States Patent
Kuroda (10) Patent No.: US 10,310,153 B2
(45) Date of Patent: Jun. 4, 2019

(54) POLARIZING PLATE, METHOD FOR MANUFACTURING POLARIZING PLATE, IMAGE DISPLAY DEVICE, METHOD FOR MANUFACTURING IMAGE DISPLAY DEVICE, AND METHOD FOR IMPROVING TRANSMITTANCE OF POLARIZING PLATE

(71) Applicant: DAI NIPPON PRINTING CO., LTD., Tokyo (JP)

(72) Inventor: Takashi Kuroda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/917,189

(22) PCT Filed: Aug. 6, 2014

(86) PCT No.: PCT/JP2014/070722
§ 371 (c)(1),
(2) Date: Mar. 7, 2016

(87) PCT Pub. No.: WO2015/037369
PCT Pub. Date: Mar. 19, 2015

(65) Prior Publication Data
US 2016/0209564 A1 Jul. 21, 2016

(30) Foreign Application Priority Data

Sep. 10, 2013 (JP) ................................. 2013-187613

(51) Int. Cl.
*G02B 5/30* (2006.01)
*G02F 1/1335* (2006.01)
*G02B 27/28* (2006.01)

(52) U.S. Cl.
CPC ........... *G02B 5/305* (2013.01); *G02B 5/3025* (2013.01); *G02B 5/3041* (2013.01);
(Continued)

(58) Field of Classification Search
CPC .. G02B 5/3025; G02B 5/3033; G02B 5/3041; G02B 5/305; G02B 5/3083;
(Continued)

(56) References Cited

U.S. PATENT DOCUMENTS 5,594,568 A * 1/1997 Abileah .............. G02F 1/13363
349/119
6,292,242 B1 * 9/2001 VanderPloeg ....... G02F 1/13363
349/118
(Continued)

FOREIGN PATENT DOCUMENTS

CN 102597861 7/2012
CN 102959459 3/2013
(Continued)

*Primary Examiner* — Nicholas R. Pasko
(74) *Attorney, Agent, or Firm* — Hamre, Schumann, Mueller & Larson, P.C.

(57) ABSTRACT

The present invention provides a polarizer excellent in transmittance even if it includes a light-transmitting substrate having no in-plane phase difference. The present invention relates to a polarizer configured to be disposed on a backlight source side in an image display device, the polarizer including at least a light-transmitting substrate having in-plane birefringence and a polarizing element layered in said order from the backlight source side, the light-transmitting substrate receiving incidence of polarized light, the light-transmitting substrate and the polarizing element being layered such that a fast axis of the light-transmitting substrate along a direction in which the substrate shows a smaller refractive index and a transmission axis of the polarizing element form an angle of 0°±30° or 90°±30°.

9 Claims, 5 Drawing Sheets (52) U.S. Cl.
CPC ......... *G02B 5/3083* (2013.01); *G02B 27/283* (2013.01); *G02F 1/13362* (2013.01); *G02F 1/133528* (2013.01); *G02F 2001/13355* (2013.01); *G02F 2001/133531* (2013.01)

(58) Field of Classification Search
CPC ........... G02F 1/133528; G02F 1/13362; G02F 1/13363; G02F 1/133634; G02F 2001/133531; G02F 2202/40; G02F 2413/08
USPC ............ 359/489.01, 489.06, 489.13, 489.11, 359/489.12
See application file for complete search history.

(56) References Cited

U.S. PATENT DOCUMENTS

| | | | |
|---|---|---|---|
| 8,111,459 B2* | 2/2012 | Uchiyama | G02B 5/3016 349/119 |
| 8,194,212 B2* | 6/2012 | Sakai | G02B 5/3016 349/117 |
| 2007/0013844 A1* | 1/2007 | Nishikouji | G02F 1/133528 349/119 |
| 2007/0236636 A1* | 10/2007 | Watson | G02B 6/0056 349/117 |
| 2008/0170294 A1* | 7/2008 | Kuroda | G02B 5/3016 359/487.05 |
| 2010/0188605 A1* | 7/2010 | Hasegawa | G02B 5/3033 349/62 |
| 2010/0231831 A1* | 9/2010 | Miyatake | G02F 1/13363 349/96 |
| 2011/0128477 A1 | 6/2011 | Izaki et al. | |
| 2011/0170041 A1* | 7/2011 | Sakai | G02B 5/3016 349/96 |
| 2013/0100378 A1 | 4/2013 | Murata et al. | |
| 2013/0162930 A1* | 6/2013 | Shin | G02B 5/3083 349/62 |
| 2014/0168579 A1* | 6/2014 | Kim | G02B 5/3033 349/96 |

FOREIGN PATENT DOCUMENTS

| | | |
|---|---|---|
| JP | 59-077401 | 5/1984 |
| JP | 6-051120 | 2/1994 |
| JP | 2004-226734 | 8/2004 |
| JP | 2009-169389 | 10/2008 |
| JP | 2009-157343 | 7/2009 |
| JP | 2010-112986 | 5/2010 |
| JP | 2010-217844 | 9/2010 |
| JP | 2011-053271 | 3/2011 |
| JP | 2011-059488 | 3/2011 |
| JP | 2011-090042 | 5/2011 |
| TW | 200932524 | 8/2009 |
| TW | 201131218 | 9/2011 |
| WO | 2009/013917 | 1/2009 |
| WO | 2011/049188 | 4/2011 |
| WO | 2011/162198 | 12/2011 |
| WO | 2013/080949 | 4/2015 |

* cited by examiner

POLARIZING PLATE, METHOD FOR MANUFACTURING POLARIZING PLATE, IMAGE DISPLAY DEVICE, METHOD FOR MANUFACTURING IMAGE DISPLAY DEVICE, AND METHOD FOR IMPROVING TRANSMITTANCE OF POLARIZING PLATE

TECHNICAL FIELD

The present invention relates to a polarizer, a method for producing a polarizer, an image display device, a method for producing an image display device, and a method for improving the light transmittance of a polarizer.

BACKGROUND ART

Liquid crystal display devices have various advantages such as low power consumption, light weight, and slim profile. Owing to these advantages, they have taken the place of conventional CRT displays in various fields. Particularly, liquid crystal display devices are essential components in mobile devices having spread rapidly in recent years, such as mobile phones or smartphones.

In a known structure of such liquid crystal displays, a pair of polarizers are arranged on a backlight source in a crossed Nicol state on a viewer side and a backlight source side of a liquid crystal cell.

In a liquid crystal display device having such a structure, light emitted from the backlight source passes through the polarizer on the backlight source side, the liquid crystal cell, and the polarizer on the viewer side, whereby an image is displayed on a display screen.

Commonly, the polarizer has a layered structure including a polarizing element and a light-transmitting substrate, and the light-transmitting substrate of the polarizer is a film of cellulose esters typified by triacetylcellulose (see Patent Literature 1). Cellulose esters are often used because of the following advantages. Since cellulose esters are excellent in transparency and optical isotropy to hardly have an in-plane phase difference (retardation value is low), they scarcely changes the vibration direction of the incident linear polarized light to be less likely to affect the display quality of the liquid crystal display device. In addition, since they have appropriate water permeability, moisture contents remaining in a polarizing element upon production of the polarizer can be dried through an optical layered body.

Cellulose ester films, however, have too high moisture permeability to problematically cause reduction in the degree of polarization due to discoloration in a moisture resistance test. Because of such a problem of cellulose ester films, a protective film to be used is desired to be a versatile film that is excellent in transparency, heat resistance, and mechanical strength, and is readily available at lower costs than that of cellulose ester films or producible by a simple method. For example, an attempt is made to use polyester films such as polyethylene terephthalate films instead of cellulose ester films (see Patent Literature 2).

In a liquid crystal display device having such a structure, efficient transmission of light from a backlight source to a display screen is important to improve the luminance of the display screen. Particularly, in mobile devices such as smartphones having spread rapidly in recent years, more efficient transmission of light from a backlight source to a display screen is desired as it directly influences the battery duration time.

In a known example of such a liquid crystal display device, a polarization separation film is provided between a backlight source and a polarizer on the backlight source side to allow polarized light to be incident on the polarizer on the backlight source side, thereby improving the luminance of the display screen. The polarization separation film allows specific polarization components to pass therethrough and reflects the other polarization components back to the backlight source side.

However, if a polarizer on the backlight source side in a liquid crystal display device having such a structure includes a protective film formed of a polyester film, the transmittance may lower. Since a polyester film has a high-polarizability aromatic ring in its molecular chain and thus has very high intrinsic birefringence. Accordingly, the polyester film has a characteristic of easily exhibiting birefringence accompanying orientation of the molecular chain as a result of stretching treatment for imparting excellent transparency, heat resistance, and mechanical strength.

Accordingly, if a polarizer that includes a light-transmitting substrate having in-plane birefringence, such as a polyester film, is used as a polarizer on the backlight unit side in a liquid crystal display device, the polarization state of specific polarization components having passed through the polarization separation film may change to lower the transmittance.

CITATION LIST

Patent Literature

Patent Literature 1: JP 06-51120 A
Patent Literature 2: WO 2011/162198

SUMMARY OF INVENTION

Technical Problem

The present invention aims to, in consideration of the state of the art, provide a polarizer excellent in light transmittance even if a light-transmitting substrate having in-plane birefringence is used. The present invention also aims to provide a method for producing the polarizer, an image display device, a method for producing an image display device, and a method for improving the light transmittance of a polarizer.

Solution to Problem

The present invention relates to a polarizer configured to be disposed on a backlight source side in an image display device. The polarizer includes at least a light-transmitting substrate having in-plane birefringence and a polarizing element layered in said order from the backlight source side. The light-transmitting substrate having in-plane birefringence receives incidence of polarized light. The light-transmitting substrate having in-plane birefringence and the polarizing element are layered such that a fast axis of the light-transmitting substrate having in-plane birefringence along a direction in which the substrate shows a smaller refractive index and a transmission axis of the polarizing element form an angle of $0°\pm30°$ or $90°\pm30°$.

In the polarizer of the present invention, the light-transmitting substrate having in-plane birefringence and the polarizing element are preferably layered such that the fast axis of the light-transmitting substrate having in-plane birefringence along a direction in which the substrate shows a smaller refractive index and the transmission axis of the polarizing element form an angle of $0°\pm15°$ or $90°\pm15°$.

Preferably, the light-transmitting substrate having in-plane birefringence has a difference (nx−ny) between the refractive indexes of 0.01 or greater, where nx represents a refractive index in the direction of the slow axis in which the substrate shows a greater refractive index and ny represents a refractive index in the direction of the fast axis that is orthogonal to the slow axis.

Preferably, the light-transmitting substrate having in-plane birefringence satisfies the relation of nx>N>ny, where nx represents a refractive index in the direction of the slow axis of the light-transmitting substrate in which the substrate shows a greater refractive index, ny represents a refractive index in the direction of the fast axis that is orthogonal to the slow axis, and N represents an average refractive index of the light-transmitting substrate. The fast axis and the transmission axis of the polarizing element preferably form an angle of 0°±2°.

The present invention also relates to a method for producing a polarizer configured to be disposed on a backlight source side in an image display device. The polarizer includes at least a light-transmitting substrate having in-plane birefringence and a polarizing element layered in said order. The method includes the step of layering the light-transmitting substrate having in-plane birefringence and the polarizing element such that a fast axis of the light-transmitting substrate having in-plane birefringence along a direction in which the substrate shows a smaller refractive index and a transmission axis of the polarizing element form an angle of 0°±30° or 90°±30°.

The present invention also relates to an image display device including the polarizer of the present invention.

The image display device of the present invention preferably includes a polarization separation film provided between the backlight source and the light-transmitting substrate having in-plane birefringence.

Preferably, the image display device of the present invention further includes, on a viewer side, an upper polarizer including at least an upper light-transmitting substrate having in-plane birefringence provided on an upper polarizing element. The upper light-transmitting substrate having in-plane birefringence and the upper polarizing element are arranged such that a fast axis of the upper light-transmitting substrate having in-plane birefringence along a direction in which the substrate shows a greater refractive index and a transmission axis of the polarizing element do not form an angle of 90°.

The present invention also relates to a method for producing an image display device that includes a polarizer configured to be disposed on a backlight source side in an image display device. The polarizer includes a light-transmitting substrate having in-plane birefringence and a polarizing element layered in said order. The method includes the step of layering the light-transmitting substrate having in-plane birefringence and the polarizing element such that a fast axis of the light-transmitting substrate having in-plane birefringence along a direction in which the substrate shows a smaller refractive index and a transmission axis of the polarizing element form an angle of 0°±30° or 90°±30°.

The present invention also relates to a method for improving the transmittance of a polarizer configured to be disposed on a backlight source side in an image display device. The polarizer includes at least a light-transmitting substrate having in-plane birefringence and a polarizing element layered in said order. The method includes the step of layering the light-transmitting substrate having in-plane birefringence and the polarizing element such that a fast axis of the light-transmitting substrate having in-plane birefringence along a direction in which the substrate shows a smaller refractive index and a transmission axis of the polarizing element form an angle of 0°±30° or 90°±30°.

The present invention is specifically described in the following.

In the present invention, the word "resin" includes curable resin precursors such as monomers, oligomers, and prepolymers, unless otherwise specified.

The present inventors made an intensive study of a polarizer configured to be disposed on a backlight source side in an image display device, the polarizer including a layered body of a light-transmitting substrate and a polarizing element and receiving incidence of polarized light. As a result, the present inventors found out that, if a light-transmitting substrate having in-plane birefringence is used, the light transmittance of the polarizer depends on the angle between a fast axis of the light-transmitting substrate along a direction in which the substrate shows a smaller refractive index and a transmission axis of the polarizing element.

In other words, the present inventors found that, if the light-transmitting substrate and the polarizing element are layered such that the fast axis of the light-transmitting substrate having in-plane birefringence along a direction in which the substrate shows a smaller refractive index and the transmission axis of the polarizing element form an angle within a specific range, the light transmittance of the polarizer can be improved. Based on these findings, the present inventors made further investigation to find out that, if a light-transmitting substrate formed of cellulose esters or the like, which has been conventionally used as an optical isotropic material, is imparted with birefringence, the light transmittance can be improved in comparison with the case where the light-transmitting substrate is used as is, namely, as an optical isotropic material. In this manner, the present invention has been completed.

The polarizer of the present invention is configured to be disposed on the backlight source side in an image display device and includes at least a light-transmitting substrate having in-plane birefringence and a polarizing element layered in said order.

The light-transmitting substrate is not limited as long as it has in-plane birefringence, and examples thereof include substrates formed of polycarbonates, acrylics, and polyesters. In particular, polyester substrates are preferred as they are advantageous in terms of cost and mechanical strength. In the following, a description is given on a case where the light-transmitting substrate having in-plane birefringence is a polyester substrate.

It is to be noted that in the polarizer of the present invention, even a light-transmitting substrate made of cellulose esters or the like, which has been conventionally used as an optical isotropic material, can be used as the light-transmitting substrate, on condition that it is imparted with birefringence.

In the polarizer of the present invention, the refractive index (nx) in the direction (direction of slow axis) showing a greater refractive index in the plane of the polyester substrate and the refractive index (ny) in the direction (direction of fast axis) orthogonal to the slow axis have a difference nx−ny (hereafter, also referred to as Δn) of 0.01 or more. If the Δn is less than 0.01, the effect of improving the transmittance may be reduced. The Δn is preferably 0.30 or less. If the Δn is more than 0.30, the polyester substrate needs to be excessively stretched. In such a case, the polyester substrate may easily suffer rents, tears, or the like and may markedly deteriorate in the practicality as an industrial material.

From the standpoint described above, the lower limit of the Δn is more preferably 0.05, and the upper limit thereof is more preferably 0.27. If the Δn is more than 0.27, the durability of the polyester substrate in the moisture and heat resistance test may be poor. For better durability in the moisture and heat resistance test, the upper limit of the Δn is still more preferably 0.25. If the Δn falls within the above range, the light transmittance can be favorably improved.

Whether or not the light-transmitting substrate has in-plane birefringence herein is determined as follows. If the refractive indexes at a wavelength of 550 nm satisfy Δn(nx−ny)≥0.0005, such a light-transmitting substrate is regarded as birefringent. If the refractive indexes at a wavelength of 550 nm satisfy Δn<0.0005, such a light-transmitting substrate is regarded as not birefringent. The birefringence can be measured with a KOBRA-WR (Oji Scientific Instruments) under the conditions of the measuring angle set to 0° and the measuring wavelength set to 552.1 nm. The film thickness and the average refractive index are needed in calculation of the birefringence. The film thickness can be measured, for example, with a micrometer (Digimatic Micrometer, Mitsutoyo Corporation) or an electric micrometer (Anritsu Corporation). The average refractive index can be measured with an Abbe refractometer or an ellipsometer.

Here, TD80UL-M (Fujifilm Corporation) made of triacetyl cellulose and ZF16-100 (Zeon Corporation) made of cycloolefin polymers, which are commonly known as isotropic materials, are determined to have a Δn of 0.0000375 and 0.00005, respectively, by the above method, and therefore are not birefringent (being isotropic).

In other method for measuring the birefringence, the direction of the orientation axis (direction of the principal axis) of the light-transmitting substrate is measured using two polarizers, and the refractive indexes (nx, ny) of the two axes orthogonal to the orientation axis are measured using an Abbe refractometer (Atago Co., Ltd., NAR-4T). In another method, a black plastic tape (Yamato Vinyl Tape No 200-38-21, 38 mm width) is attached onto the rear side of the light-transmitting substrate and the five-degree reflectance is measured using S-polarized light (polarized light measurement) for the cases where the slow axis is set in parallel with S-polarized light and where the fast axis is set in parallel with S-polarized light using a spectrophotometer (V7100-type VAR-7010, automatic absolute reflectance measurement unit, Jasco Corp.). Using Equation (1) showing a relation between the reflectance (R) and the refractive index (n), the refractive indexes (nx, ny) of the slow axis and the fast axis at each wavelength can be calculated.

$$R(\%) = (1-n)^2/(1+n)^2 \quad (1)$$

The average refractive index can be measured with an Abbe refractometer or an ellipsometer. The refractive index nz in the thickness direction of the light-transmitting film can be calculated using Equation (2) below based on nx and ny measured by the above method.

$$\text{Average refractive index } N = (nx+ny+nz)/3 \quad (2)$$

Here, the calculation method of the nx, ny, and nz is described with reference to a specific example.

The nx represents a refractive index of the light-transmitting substrate in the direction of the slow axis. The ny represents a refractive index of the light-transmitting substrate in the direction of the fast axis. The nz represents a refractive index of the light-transmitting substrate in the thickness direction.

Calculation of Wavelength Dispersion of Three-Dimensional Refractive Index

First, a specific description is given on a method for calculating the wavelength dispersion of the three-dimensional refractive index with reference to the case of a cycloolefin polymer.

Figure 1:
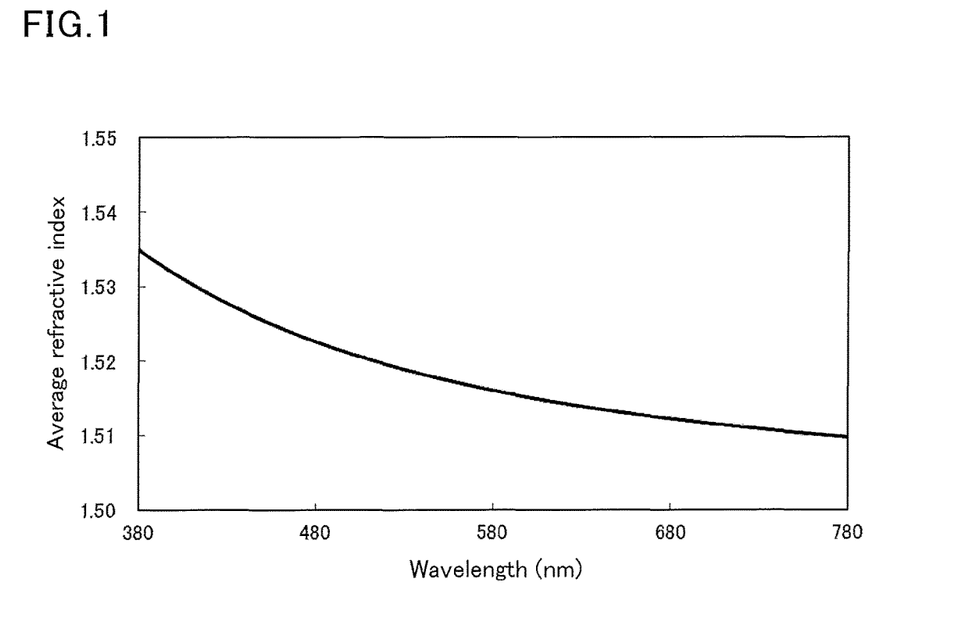
FIG. 1 is a graph showing a wavelength dispersion of the average refractive index of a cycloolefin polymer film having no in-plane birefringence.

The wavelength dispersion of the average refractive index of a cycloolefin polymer film having no in-plane birefringence is measured with an ellipsometer (UVISEL, Horiba Ltd.). FIG. 1 shows the result. Based on the measurement result, the wavelength dispersion of the average refractive index of the cycloolefin polymer film having no in-plane birefringence is defined as the wavelength dispersion of each of the refractive indexes nx, ny, and nz.

The film is uniaxially stretched from a free end at a stretching temperature of 155° C. to give a film having in-plane birefringence. The film thickness is 100 μm. The retardation values of the film obtained by uniaxial stretching from a free end are measured with a birefringence meter (KOBRA-21ADH, Oji Scientific Instruments) at incident angles of 0° and 40° and wavelengths of 447.6 nm, 547.0 nm, 630.6 nm, and 743.4 nm.

Figure 2:
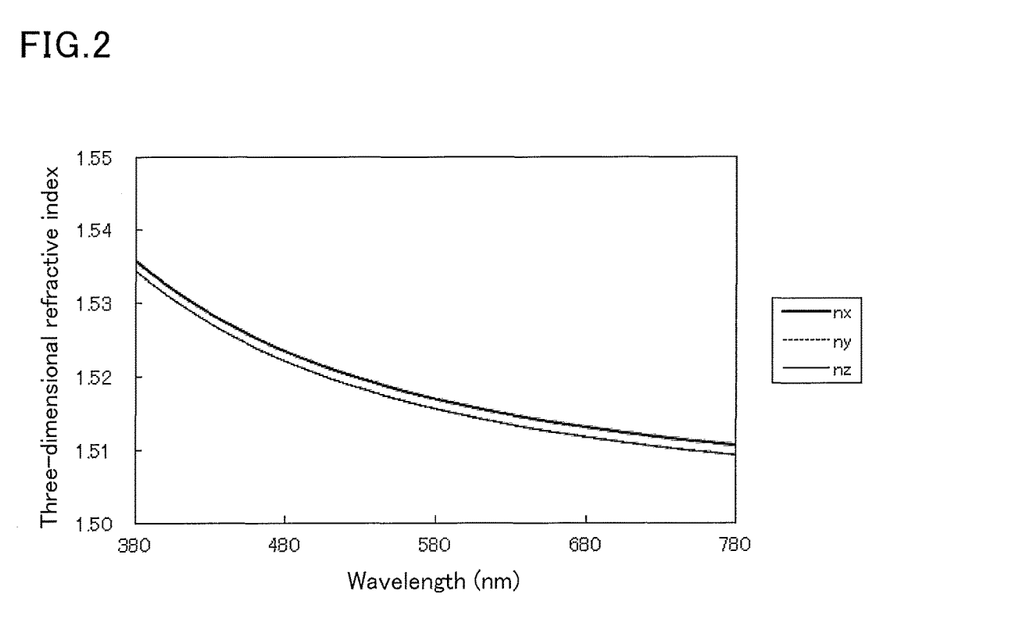
FIG. 2 is a graph showing a wavelength dispersion of the three-dimensional refractive index of a cycloolefin polymer film having in-plane birefringence.

Based on the average refractive index (N) and the retardation value at each wavelength, the wavelength dispersion of the three-dimensional refractive index is calculated using software for calculating three-dimensional wavelength dispersion provided to the birefringence meter, based on Cauchy's equation or Sellmeier's equation, or the like. FIG. 2 shows the results. In FIG. 2, ny and nz are almost completely overlapped with each other. In this manner, the wavelength dispersion of the three-dimensional refractive index of the cycloolefin polymer film having in-plane birefringence is obtained.

Calculation of Refractive Index Nx, Ny, and Nz Using Spectrophotometer

A specific description is given on a method for calculating the refractive indexes nx, ny, and nz using a spectrophotometer with reference to the case of polyethylene terephthalate.

The wavelength dispersion of the average refractive index of polyethylene terephthalate having no in-plane birefringence is calculated in the same manner as in the case of the wavelength dispersion of the three-dimensional refractive index.

Figure 3:
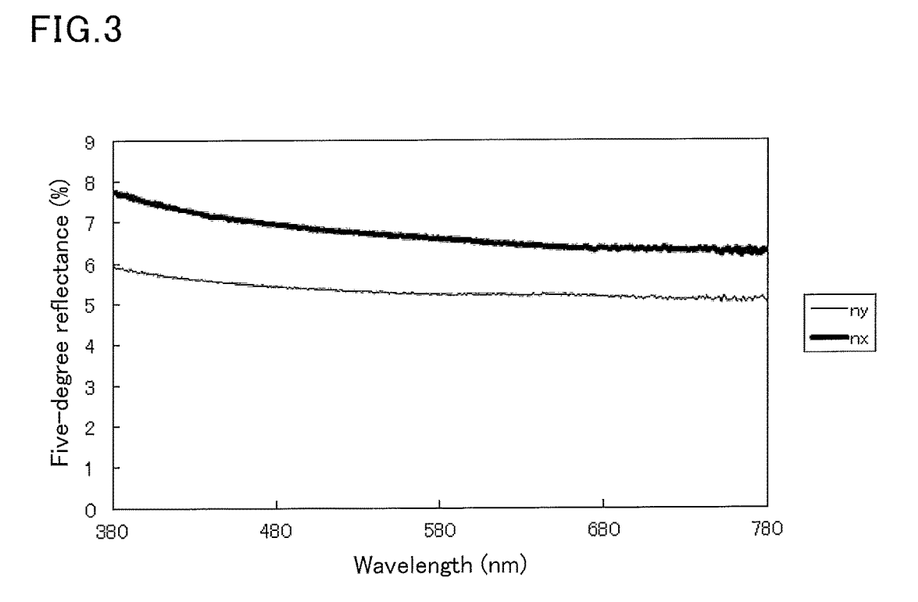
FIG. 3 is a graph showing five-degree reflectances of nx and ny measured with a spectrophotometer.

The wavelength dispersion of the refractive indexes (nx, ny) of polyethylene terephthalate having in-plane birefringence is calculated using a spectrophotometer (V7100-type, automatic absolute reflectance measurement unit VAR-7010, Jasco Corp.). The opposite side of measuring side is covered with a black plastic tape (e.g., Yamato Vinyl Tape No 200-38-21, 38 mm width) that is wider than the measurement-spot area for prevention of back reflection. The five-degree spectral reflectance of the light-transmitting substrate with the orientation axis set in parallel with S-polarized light and that with an axis orthogonal to the orientation axis set in parallel with S-polarized light are measured (polarized light measurement). FIG. 3 shows the results. The wavelength dispersion of the refractive indexes (nx, ny) is calculated using Equation (1) that shows a relation between the reflectance (R) and the refractive index (n). The direction in which the substrate shows a greater reflectance (refractive index calculated using Equation (1)) is taken as nx (also referred to as a slow axis). The direction in which the substrate shows a smaller reflectance (refractive index calculated using Equation (1)) is taken as ny (also referred to as a fast axis). Here, the orientation axis of the film is determined as follows. A film having in-plane birefringence is sandwiched between two polarizers arranged in a crossed Nicol state on a light source, and rotated. The direction of the transmission axis or the absorption axis of the polarizers at the time when light leakage is smallest can be taken as the orientation axis of the film. The refractive index nz can be calculated based on the average refractive index (N) using Equation (2).

Any material satisfying the above Δn may be used for the polyester substrate. Examples thereof include linear saturated polyesters synthesized from any of aromatic dibasic acids and ester-forming derivatives thereof and any of diols and ester-forming derivatives thereof. Specific examples of the polyesters include polyethylene terephthalate, polyethylene isophthalate, polybutylene terephthalate, poly(1,4-cyclohexylene dimethylene terephthalate), and polyethylene naphthalate (e.g., polyethylene-2,6-naphthalate, polyethylene-1,4-naphthalate, polyethylene-1,5-naphthalate, polyethylene-2,7-naphthalate, polyethylene-2,3-naphthalate). The polyester used for the polyester substrate may be a copolymer of these polyesters, or may be one prepared by blending a polyester as a main component (for example, 80 mol % or higher) and one or more other resins each in a small amount (for example, 20 mol % or lower). The polyester is particularly preferably polyethylene terephthalate or polyethylene naphthalate because of their good balance of properties such as mechanical physical properties and optical characteristics. The polyester is particularly preferably polyethylene terephthalate (PET). This is because polyethylene terephthalate is very versatile and is readily available. According to the present invention, even a very versatile film of, for example, PET can be formed into a polarizer excellent in light transmittance. Further, PET is excellent in transparency and in heat or mechanical characteristics, Δn of which may be controlled by stretching. In addition, PET has high intrinsic birefringence. Thus, birefringence is relatively easily provided.

The polyester substrate may be obtained by any method that provides the above Δn. Examples thereof include a method in which a material polyester such as PET is molten; the molten polyester is extrusion-molded into a sheet to prepare an unstretched polyester; the unstretched polyester is stretched in the transverse direction at a temperature not lower than the glass transition temperature using, for example, a tenter; and then the stretched film is subjected to heat treatment.

The transverse direction stretching temperature is preferably 80° C. to 130° C., more preferably 90° C. to 120° C. The transverse direction stretching ratio is preferably 2.5 to 6.0 times, more preferably 3.0 to 5.5 times. A transverse direction stretching ratio exceeding 6.0 times may easily decrease the transparency of the polyester substrate. A stretching ratio of lower than 2.5 times may cause a lower stretching tension, thereby providing low birefringence of the polyester substrate.

In the present invention, the transverse direction stretching of the unstretched polyester under the aforementioned conditions may be followed by stretching in the flow direction (hereinafter, also referred to as machine direction stretching) relative to the transverse direction stretching using a biaxial stretching tester. In this case, the stretching ratio of the machine direction stretching is preferably twice or lower. A stretching ratio of higher than twice in the machine direction stretching may fail to set the Δn within the above preferable range.

The temperature at the heat treatment is preferably 100° C. to 250° C., more preferably 180° C. to 245° C.

The polyester substrate is preferably 5 to 300 μm in thickness. The polyester substrate with a thickness of less than 5 μm may easily suffer rents, tears, or the like and may markedly result in deterioration in the practicality as an industrial material. In contrast, the polyester substrate with a thickness exceeding 300 μm may disadvantageously be very rigid and may deteriorate in flexibility that is characteristic of polymeric films, thereby resulting in deterioration in the practicality as an industrial material. The lower limit of the thickness of the polyester substrate is more preferably 10 μm, whereas the upper limit thereof is more preferably 200 μm, still more preferably 150 μm.

The polyester substrate preferably has a transmittance within the visible light region of 80% or higher, more preferably 84% or higher. The transmittance can be measured in conformity with JIS K7361-1 (Plastics—Determination of the total luminous transmittance of transparent materials).

In the present invention, the polyester substrate may be surface-treated within the scope of the present invention. Examples of the surface treatment include saponification, glow discharge, corona discharge, ultraviolet (UV), and flame.

The polarizing element is not limited, and examples thereof include polyvinyl alcohol films, polyvinyl formal films, polyvinyl acetal films, ethylene-vinyl acetate copolymer-based saponified films each subjected to dying with iodine or the like and stretching.

In the polarizer of the present invention, the light-transmitting substrate and the polarizing element are layered such that the fast axis of the light-transmitting substrate along a direction in which the substrate shows a smaller refractive index and the transmission axis of the polarizing element form an angle of 0°±30° or 90°±30°. The polarizer of the present invention including the light-transmitting substrate and the polarizing element disposed as above has excellent light transmittance as described above. In other words, if the angle formed between the fast axis of the light-transmitting substrate and the transmission axis of the polarizing element is not within the above range, specifically, less than 45°±15°, the polarizer of the present invention has markedly low light transmittance. The reason for this is described below.

In the polarizer including a polarization separation film between a light source and a polarizing element, commonly, the direction of the polarization axis of light passing through the transmission axis of the polarizing element is set to match the direction of the polarization axis of polarized light having passed through the polarization separation film. In a case where a light-transmitting substrate having in-plane birefringence is provided between the polarizing element and the polarization separation film and the angle formed between the fast axis of the light-transmitting substrate and the transmission axis of the polarizing element is set to less than 45°±15°, the polarization axis of the polarized light having passed through the polarization separation film changes and the light is absorbed by the absorption axis of the polarizing element. As a result, the light transmittance of the polarizer is significantly lowered.

In the polarizer of the present invention, the light-transmitting substrate and the polarizing element are preferably layered such that the fast axis of the light-transmitting substrate and the transmission axis of the polarizing element form an angle of 0°±15° or 90°±15°. With the angle formed between the fast axis of the light-transmitting substrate and the transmission axis of the polarizing element within the above range, the polarizer of the present invention has markedly favorable light transmittance.

In the polarizer of the present invention, the light-transmitting substrate and the polarizing element are more preferably layered such that the fast axis of the light-transmitting substrate and the transmission axis of the polarizing element form an angle of 0°±5°. With the angle formed between the fast axis of the light-transmitting substrate and the transmission axis of the polarizing element within the above range, the polarizer of the present invention has significantly favorable light transmittance. The reason for this is that, if the angle formed between the fast axis of the light-transmitting substrate along a direction in which the substrate shows a smaller refractive index and the transmission axis of the polarizing element is within the above range, polarized light has a smaller reflectance upon incidence on the light-transmitting substrate.

The reason is described below.

When the polarized light having passed through the polarization separation film is incident on the polarizer, the polarized light passes through the light-transmitting substrate with its vibration direction maintained whether the angle formed between the fast axis of the light-transmitting substrate and the transmission axis of the polarizing element is 0° or 90°. However, if the light enters the light-transmitting substrate from the air interface, the light is reflected as shown in the following equation. In the equation, ρ represents a reflectance and na represents an in-plane refractive index of the light-transmitting substrate in the same direction as the vibration direction of light.

$$\rho=(1-na)^2/(1+na)^2.$$

The transmittance τ of the polarizer can be calculated using the following equation. Since the material is the same, the absorptance α is also the same. Accordingly, the transmittance τ can be increased by reducing the reflectance ρ.

$$\tau=1-\rho-\alpha.$$

If the light-transmitting substrate having in-plane birefringence and the polarizing element are layered such that the fast axis of the light-transmitting substrate in which the substrate shows a smaller refractive index and the transmission axis of the polarizing element form an angle of 0°, the reflectance of light is smallest to increase the transmittance. The reason for this is that the light is reflected due to a difference between the smallest refractive index and the refractive index of the air in the plane of the light-transmitting substrate. In contrast, if the light-transmitting substrate having in-plane birefringence and the polarizing element are layered such that the fast axis of the light-transmitting substrate along a direction in which the substrate shows a smaller refractive index and the transmission axis of the polarizing element form an angle of 90°, the reflectance of light is largest to lower the transmittance. The reason for this is that the light is reflected due to a difference between the largest refractive index and the refractive index of the air.

In the polarizer of the present invention, following polarizer is most preferably, the refractive index (nx) in the direction of the slow axis that shows a greater refractive index of the light-transmitting substrate having in-plane birefringence, the refractive index (ny) in the direction of the fast axis that is orthogonal to the direction of the slow axis, and the average refractive index (N) of the light-transmitting substrate satisfy the following inequality, and the fast axis and the transmission axis of the polarizing element form an angle of 0°±2°. The reason for this is that the transmittance can be improved compared to the case of using a light-transmitting substrate as is, namely, as an isotropic material.

$$nx>N>ny.$$

The polarizer of the present invention may include a low refractive index layer having a smaller refractive index than the refractive index ny in the direction of the fast axis of the light-transmitting substrate, on a surface of the light-transmitting substrate having in-plane birefringence on the side opposite to the side where the polarizing element is layered. Such a low refractive index layer having a smaller refractive index than the refractive index ny in the direction of the fast axis of the light-transmitting substrate is not limited, and may be a conventionally known material.

In the polarizer of the present invention, polarized light is incident on the light-transmitting substrate having in-plane birefringence.

In the polarizer of the present invention, the polarized light is not limited, and preferable examples thereof include light that is emitted from a backlight source of an image display device such as a liquid crystal display device and polarized while passing through a polarization separation film. The light source of the polarizer of the present invention may be a conventionally known polarization light source.

The polarization separation film performs polarization separation by transmitting only specific polarization components in the light emitted from the backlight source and reflecting the other polarization components. In a case where the polarizer of the present invention is used in a liquid crystal display device, the polarizer of the present invention is provided between a liquid crystal cell and a polarization separation film. Since the polarizer of the present invention selectively transmits specific polarization components, the polarization components other than the specific polarization components (polarization components passing through the polarizer of the present invention) are reflected by the polarization separation film and can be reused to increase the quantity of light passing through the polarizer of the present invention. Thus, the luminance of the display screen of the liquid crystal display device can be improved.

The polarization separation film may be a film commonly used in liquid crystal display devices. The polarization separation film may be a commercial product, and examples thereof include DBEF series available from 3M Company.

In the polarizer of the present invention, the light-transmitting substrate and the polarizing element are layered such that the fast axis of the light-transmitting substrate and the transmission axis of the polarizing element have a specific relation, and therefore, the light transmittance of the polarizer is improved. The present invention also encompasses such a method for improving the light transmittance using the polarizer of the present invention.

The polarizer of the present invention can be produced by layering the light-transmitting substrate having in-plane birefringence and the polarizing element such that the fast axis of the light-transmitting substrate along a direction in which the substrate shows a smaller refractive index and the transmission axis of the polarizing element form an angle of 0°±30° or 90°±30°. The present invention also encompasses such a method for producing the polarizer of the present invention.

According to the present invention, the method for producing a polarizer configured to be disposed on a backlight source side in an image display device, the polarizer including at least a light-transmitting substrate having in-plane birefringence and a polarizing element layered in said order, includes the step of layering the light-transmitting substrate having in-plane birefringence and the polarizing element such that the fast axis of the light-transmitting substrate along a direction in which the substrate shows a smaller refractive index and the transmission axis of the polarizing element form an angle of 0°±30° or 90°±30°.

The light-transmitting substrate having in-plane birefringence and the polarizing element used in the method for producing an image display device of the present invention may be those exemplified for the polarizer of the present invention described above.

The light-transmitting substrate having in-plane birefringence and the polarizing element are preferably layered using a known adhesive.

The present invention also encompasses an image display device including the polarizer of the present invention.

The image display device of the present invention preferably further includes, on a viewer side, an upper polarizer including at least an upper light-transmitting substrate having in-plane birefringence and an upper polarizing element, the upper light-transmitting substrate being provided on the upper polarizing element. The upper light-transmitting substrate having in-plane birefringence and the upper polarizing element are preferably arranged such that a fast axis of the upper light-transmitting substrate having in-plane birefringence along a direction in which the substrate shows a smaller refractive index and a transmission axis of the upper polarizing element do not form an angle of 90°. If the fast axis of the upper light-transmitting substrate having in-plane birefringence along a direction in which the substrate shows a smaller refractive index and the transmission axis of the upper polarizing element form an angle of 90°, the transmittance of the light emitted from the backlight source of the image display device of the present invention through the upper polarizing element may be reduced. As a result, the light transmittance of the image display device of the present invention may be lowered.

The angle is more preferably less than 0°±30°, still more preferably 0°±10°.

The reason for this is that, since the difference in the refractive index of light passing through the air interface from the light-transmitting substrate is reduced to lower the reflectance, the transmittance of the upper polarizer increases.

The upper light-transmitting substrate having in-plane birefringence and the upper polarizing element in the upper polarizer may be those exemplified for the light-transmitting substrate and the polarizing element in the polarizer of the present invention.

According to the present invention, the image display device including the upper polarizer is preferably a liquid crystal display device including the upper polarizer on the viewer side of liquid crystal cell and the polarizer of the present invention on the backlight source side of the liquid crystal cell. The transmission axes of the polarizing element of the polarizer and the upper polarizing element of the upper polarizer of the present invention are preferably arranged in a crossed Nicol state.

Figure 8:
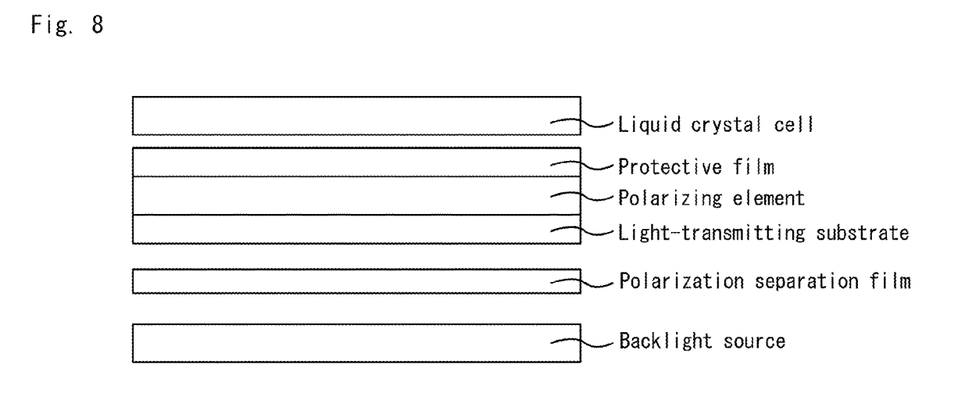
FIG. 8 is a schematic view illustrating an image display device.

The image display device of the present invention is preferably a liquid crystal display device (LCD) including a liquid crystal cell and a backlight source emitting light from the back side of the liquid crystal cell, which further includes the polarizer of the present invention on the backlight source side of the liquid crystal cell. See FIG. 8.

In the case where the image display device of the present invention is a liquid crystal display device, the backlight source emits light from the lower side of the polarizer of the present invention, and the polarization separation film described above may be provided between the backlight source and the polarizer of the present invention. Moreover, a retardation film may be disposed between the liquid crystal cell and the polarizer of the present invention. The liquid crystal display device may have an adhesive layer between the layers, if necessary.

In the case where the image display device of the present invention is a liquid crystal display device having the optical layered body, the backlight source of the liquid crystal display device is not limited, and is preferably a white-light-emitting diode (white LED). The image display device of the present invention is preferably a liquid crystal display device including a white-light-emitting diode as a backlight source.

The white LED is a white-color-emitting element which is of a fluorescent substance type, namely, which comprises a blue- or ultraviolet-light-emitting diode using a compound semiconductor and a fluorescent substance in combination. In particular, a white-light-diode of a light-emitting element that comprises a blue-light-emitting diode utilizing a compound semiconductor and an yttrium/aluminum/garnet-type yellow fluorescent substance in combination has a continuous and wide emission spectrum. Such a diode is effective in improving the light transmittance and also is excellent in luminous efficacy. In addition, a white LED with low electric energy consumption can be widely used, and thus the effect of low energy consumption can be achieved.

The image display device of the present invention can be used for displaying images on televisions, computers, tablet PCs, and the like. In particular, the image display device of the present invention may be suitably used for any display devices for high-definition images.

The present invention also encompasses a method for producing an image display device including a polarizer configured to be disposed on a backlight source side in an image display device. The polarizer includes a light-transmitting substrate having in-plane birefringence and a polarizing element layered in said order.

Specifically, the method for producing an image display device of the present invention that comprises a polarizer configured to be disposed on a backlight source side in an image display device. The polarizer includes a light-transmitting substrate having in-plane birefringence and a polarizing element layered in said order.

The method includes the step of layering the light-transmitting substrate and the polarizing element such that a fast axis of the light transmitting substrate along a direction in which the substrate shows a smaller refractive index and a transmission axis of the polarizing element form an angle of 0°±30° or 90°±30°.

In the method for producing an image display device of the present invention, as the polarizer and the components thereof, i.e., the light-transmitting substrate having in-plane birefringence and the polarizing element, those described above for the polarizer of the present invention may be used.

As mentioned above, since, in the polarizer of the present invention, a light-transmitting substrate and a polarizing element are layered such that the fast axis of the light-transmitting substrate and the transmission axis of the polarizing element satisfy a specific relation, light transmittance of the polarizer of the present invention has been improved. Including such a polarizer of the present invention, the image display device of the present invention also has improved light transmittance.

Advantageous Effects of Invention

Having a configuration as described above, the polarizer of the present invention has excellent light transmittance even if a light-transmitting substrate having in-plane birefringence is used therein. Moreover, even a polarizer including a conventional film made of cellulose esters typified by triacetyl cellulose having no in-plane phase difference can have excellent transmittance if it is imparted with birefringence.

BRIEF DESCRIPTION OF DRAWINGS

FIG. 4 is a schematic view illustrating a layer structure of a polarizer according to each example and the like.

FIG. 5 is a spectrum of a light source used in examples and the like.

FIG. 6 is a graph showing a wavelength dispersion of the refractive index of a protective film used in examples and the like.

FIG. 7 is a graph showing a refractive index and an extinction coefficient of a polarizing element used in examples and the like.

DESCRIPTION OF EMBODIMENTS

The present invention is more specifically described with reference to, but not limited to, examples and comparative examples.

Production of Light-Transmitting Substrate

Production of Light-Transmitting Substrate A Having No In-Plane Birefringence

Cellulose acetate propionate (CAP504-0.2, Eastman Chemical Company) was dissolved in methylene chloride as a solvent to a solid content concentration of 15%, casted on glass, and dried to give a light-transmitting substrate A. It had a Δn of 0.00002 at a wavelength of 550 nm and an average refractive index N of 1.4838.

Production of Light-Transmitting Substrate A Having In-Plane Birefringence

The light-transmitting substrate A was uniaxially stretched from a free end by 1.5 times at 160° C. to give a light-transmitting substrate a having in-plane birefringence. Based on the calculation of the wavelength dispersion of the three-dimensional refractive index, the refractive indexes at a wavelength of 550 nm were nx=1.4845, ny=1.4835 (Δn=0.001), and nz=1.4834.

Production of Light-Transmitting Substrate B Having No In-Plane Birefringence

As a light-transmitting substrate B, an unstretched ZEONOR (Zeon Corporation) made of cycloolefin polymers was prepared. It had a Δn of 0.00004 at a wavelength of 550 nm and an average refractive index N of 1.5177.

Production of Light-Transmitting Substrate B Having In-Plane Birefringence

The light-transmitting substrate B was uniaxially stretched from a free end by 1.5 times at 150° C. to give a light-transmitting substrate b having in-plane birefringence. Based on the calculation of the wavelength dispersion of the three-dimensional refractive index, the refractive indexes at a wavelength of 550 nm were nx=1.5186, ny=1.5172, and nz=1.5173.

Production of Light-Transmitting Substrate C Having No In-Plane Birefringence

A polyethylene terephthalate material was molten at 290° C. and slowly cooled on glass to give a light-transmitting substrate C. It had a Δn of 0.00035 at a wavelength of 550 nm and an average refractive index N of 1.6167.

Production of Light-Transmitting Substrate c1 Having In-Plane Birefringence

The light-transmitting substrate C was uniaxially stretched from a fixed end by 4.0 times at 120° C. to give a light-transmitting substrate c1 having in-plane birefringence. The wavelength dispersion of the refractive indexes (nx, ny) was calculated using a spectrophotometer. The refractive indexes at a wavelength of 550 nm were nx=1.701, ny=1.6015, and nz=1.5476.

Production of Light-Transmitting Substrate c2 Having In-Plane Birefringence

The light-transmitting substrate C was uniaxially stretched from a free end by 2.0 times at 120° C. to give a light-transmitting substrate c2 having in-plane birefringence. The wavelength dispersion of the refractive indexes (nx, ny) were calculated using a spectrophotometer. The refractive indexes at a wavelength of 550 nm were nx=1.6511, ny=1.5998, and nz=1.5992.

Production of Light-Transmitting Substrate c3 Having In-Plane Birefringence

The light-transmitting substrate C was biaxially stretched at an appropriate stretching ratio at 120° C. to give a light-transmitting substrate c3 having in-plane birefringence. The wavelength dispersion of the refractive indexes (nx, ny) were calculated using a spectrophotometer. The refractive indexes at a wavelength of 550 nm were nx=1.6652, ny=1.6153, and nz=1.5696.

Production of Light-Transmitting Substrate c4 Having In-Plane Birefringence

The light-transmitting substrate C was biaxially stretched at an appropriate stretching ratio at 120° C. to give a light-transmitting substrate c4 having in-plane birefringence. The wavelength dispersion of the refractive indexes (nx, ny) was calculated using a spectrophotometer. The refractive indexes at a wavelength of 550 nm were nx=1.6708, ny=1.6189, and nz=1.5604.

Production of Light-Transmitting Substrate D Having No In-Plane Birefringence

A polyethylene naphthalate material was molten at 290° C. and slowly cooled on glass to give a light-transmitting substrate D. It had a Δn of 0.0004 at a wavelength of 550 nm and an average refractive index N of 1.6833.

Production of Light-Transmitting Substrate D Having In-Plane Birefringence

The light-transmitting substrate D was uniaxially stretched from a fixed end by 4.0 times at 120° C. to give a light-transmitting substrate d having in-plane birefringence. The wavelength dispersion of the refractive indexes (nx, ny) was calculated using a spectrophotometer. The refractive indexes at a wavelength of 550 nm were nx=1.8472, ny=1.6466, and nz=1.5561.

Calculation of Transmittance of Polarizer

Figure 4:
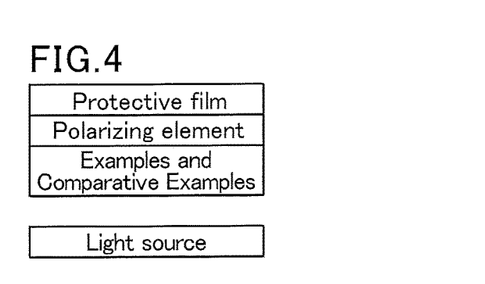

The transmittance can be calculated by the 2×2 matrix method, 4×4 matrix method, or extended Jones matrix method. The transmittance of the polarizer was calculated using simulation software (LCD Master, Shintech, Inc.) in examples, comparative examples, and reference examples. FIG. 4 illustrates the layer structure of the polarizer. The wavelength dispersion of the three-dimensional refractive index of each light-transmitting substrate was applied to the portion "Examples and Comparative Examples" in FIG. 4 for the above calculation. In the case of the light-transmitting substrate determined not to have in-plane birefringence, the average refractive indexes were set to N=nx=ny=nz. In the case of the light-transmitting substrate having in-plane birefringence, actual measured values were used. The portion of "Examples and Comparative Examples" and the portion of "Protective film" each had a thickness of 80 µm and the portion "Polarizing element" had a thickness of 20 µm.

Figure 5:
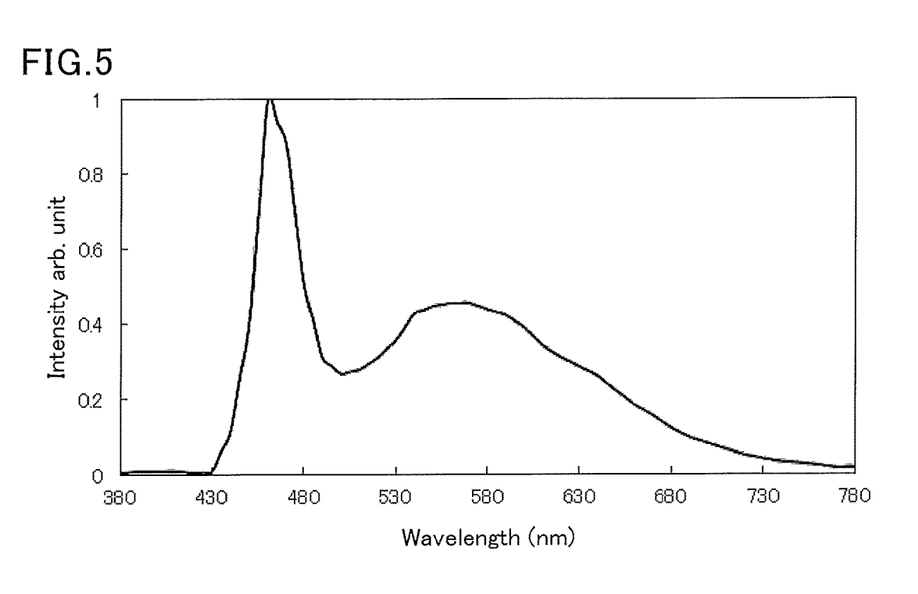

FIG. 5 shows a spectrum of a light source. The incident light was linearly polarized light to have the same state of polarization as light after passing through the polarization separation film, and vibrated in a direction of the transmission axis of the polarizing element.

Figure 6:
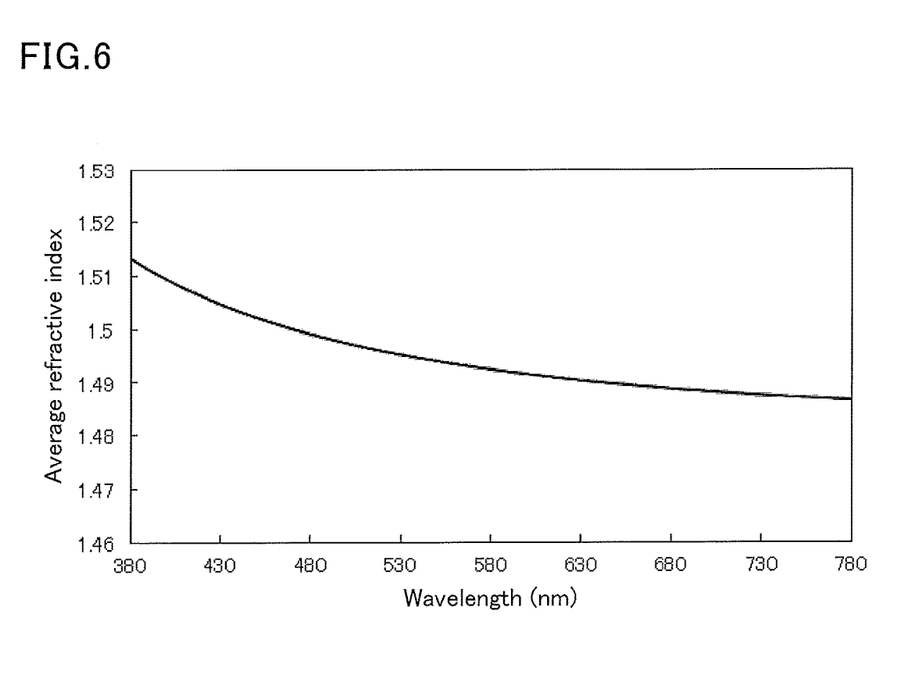

FIG. 6 shows the wavelength dispersion of the refractive index of the protective film used, and the protective film was an isotropic material.

Figure 7:
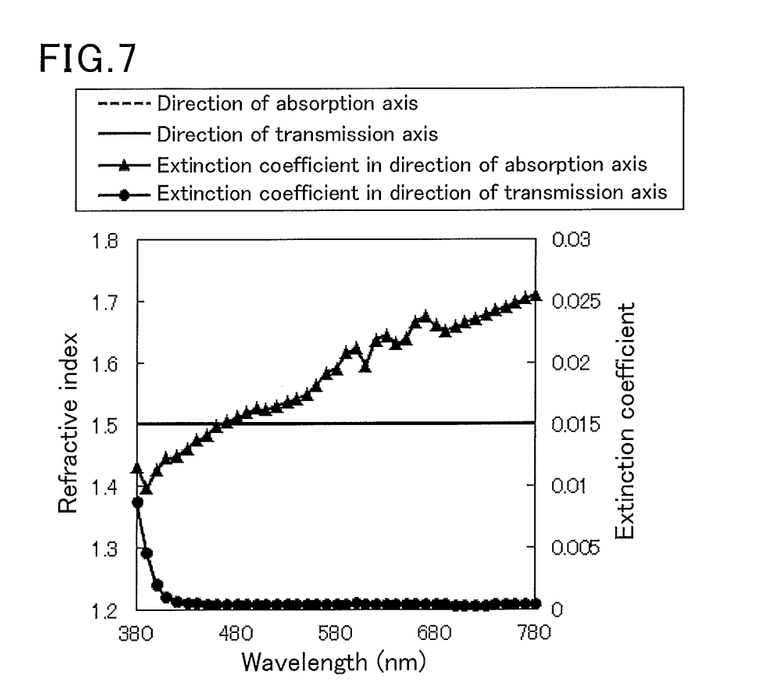

FIG. 7 shows the refractive index and the extinction coefficient of the polarizing element used. In FIG. 7, the direction of the absorption axis and the direction of the transmission axis are almost completely overlapped with each other.

Example 1

Based on the wavelength dispersion of the three-dimensional refractive index of the light-transmitting substrate a, the light-transmitting substrate and a polarizing element were disposed such that the fast axis of the light-transmitting substrate and the transmission axis of the polarizing element form an angle of 0°, and the transmittance of the polarizer was calculated.

Example 2

Based on the wavelength dispersion of the three-dimensional refractive index of the light-transmitting substrate a, the light-transmitting substrate and a polarizing element were disposed such that the fast axis of the light-transmitting substrate and the transmission axis of the polarizing element form an angle of 90°, and the transmittance of the polarizer was calculated.

Comparative Example 1

Based on the wavelength dispersion of the three-dimensional refractive index of the light-transmitting substrate a, the light-transmitting substrate and a polarizing element were disposed such that the fast axis of the light-transmitting substrate and the transmission axis of the polarizing element form an angle of 45°, and the transmittance of the polarizer was calculated.

Example 3

Based on the wavelength dispersion of the three-dimensional refractive index of the light-transmitting substrate b, the light-transmitting substrate and a polarizing element were disposed such that the fast axis of the light-transmitting substrate and the polarizing element form an angle of 0°, and the transmittance of the polarizer was calculated.

Example 4

Based on the wavelength dispersion of the three-dimensional refractive index of the light-transmitting substrate b, the light-transmitting substrate and a polarizing element were disposed such that the fast axis of the light-transmitting substrate and the transmission axis of the polarizing element form an angle of 90°, and the transmittance of the polarizer was calculated.

Comparative Example 2

Based on the wavelength dispersion of the three-dimensional refractive index of the light-transmitting substrate b, the light-transmitting substrate and a polarizing element were disposed such that the fast axis of the light-transmitting substrate and the transmission axis of the polarizing element form an angle of 45°, and the transmittance of the polarizer was calculated.

Example 5

Based on the wavelength dispersion of the three-dimensional refractive index of the light-transmitting substrate c1, the light-transmitting substrate and a polarizing element were disposed such that the fast axis of the light-transmitting substrate and the transmission axis of the polarizing element form an angle of 0°, and the transmittance of the polarizer was calculated.

Example 6

Based on the wavelength dispersion of the three-dimensional refractive index of the light-transmitting substrate c1, the light-transmitting substrate and a polarizing element were disposed such that the fast axis of the light-transmitting substrate and the transmission axis of the polarizing element form an angle of 2°, and the transmittance of the polarizer was calculated.

Example 7

Based on the wavelength dispersion of the three-dimensional refractive index of the light-transmitting substrate c1, the light-transmitting substrate and a polarizing element were disposed such that the light-transmitting substrate and the transmission axis of the polarizing element form an angle of 30°, and the transmittance of the polarizer was calculated.

Example 8

Based on the wavelength dispersion of the three-dimensional refractive index of the light-transmitting substrate c1, the light-transmitting substrate and a polarizing element were disposed such that the fast axis of the light-transmitting substrate and the transmission axis of the polarizing element form an angle of 60°, and the transmittance of the polarizer was calculated.

Example 9

Based on the wavelength dispersion of the three-dimensional refractive index of the light-transmitting substrate c1, the light-transmitting substrate and the polarizing element were disposed such that the fast axis of the light-transmitting substrate and the transmission axis of the polarizing element form an angle of 90°, and the transmittance of the polarizer was calculated.

Comparative Example 3

Based on the wavelength dispersion of the three-dimensional refractive index of the light-transmitting substrate c1, the light-transmitting substrate and a polarizing element were disposed such that the fast axis of the light-transmitting substrate and the transmission axis of the polarizing element form an angle of 45°, and the transmittance of the polarizer was calculated.

Example 10

Based on the wavelength dispersion of the three-dimensional refractive index of the light-transmitting substrate c2, the light-transmitting substrate and the polarizing element were disposed such that the fast axis of the light-transmitting substrate and the transmission axis of the polarizing element form an angle of 0°, and the transmittance of the polarizer was calculated.

Example 11

Based on the wavelength dispersion of the three-dimensional refractive index of the light-transmitting substrate c2, the light-transmitting substrate and a polarizing element were disposed such that the fast axis of the light-transmitting substrate and the transmission axis of the polarizing element form an angle of 90°, and the transmittance of the polarizer was calculated.

Comparative Example 4

Based on the wavelength dispersion of the three-dimensional refractive index of the light-transmitting substrate c2, the light-transmitting substrate and a polarizing element were disposed such that the fast axis of the light-transmitting substrate and the polarization axis of the polarizing element form an angle of 45°, and the transmittance of the polarizer was calculated.

Example 12

Based on the wavelength dispersion of the three-dimensional refractive index of the light-transmitting substrate c3, the light-transmitting substrate and a polarizing element were disposed such that the fast axis of the light-transmitting substrate and the transmission axis of the polarizing element form an angle of 0°, and the transmittance of the polarizer was calculated.

Example 13

Based on the wavelength dispersion of the three-dimensional refractive index of the light-transmitting substrate c3, the light-transmitting substrate and a polarizing element were disposed such that the fast axis of the light-transmitting substrate and the transmission axis of the polarizing element form an angle of 90°, and the transmittance of the polarizer was calculated.

Comparative Example 5

Based on the wavelength dispersion of the three-dimensional refractive index of the light-transmitting substrate c3, the light-transmitting substrate and a polarizing element were disposed such that the fast axis of the light-transmitting substrate and the transmission axis of the polarizing element form an angle of 45°, and the transmittance of the polarizer was calculated.

Example 14

Based on the Wavelength Dispersion of the Three-Dimensional refractive index of the light-transmitting substrate c4, the light-transmitting substrate and a polarizing element were disposed such that the fast axis of the light-transmitting substrate and the transmission axis of the polarizing element form an angle of 0°, and the transmittance of the polarizer was calculated.

Example 15

Based on the wavelength dispersion of the three-dimensional refractive index of the light-transmitting substrate c4, the light-transmitting substrate and a polarizing element were disposed such that the fast axis of the light-transmitting substrate and the transmission axis of the polarizing element form an angle of 90°, and the transmittance of the polarizer was calculated.

Comparative Example 6

Based on the wavelength dispersion of the three-dimensional refractive index of the light-transmitting substrate c4, the light-transmitting substrate and a polarizing element were disposed such that the fast axis of the light-transmitting substrate and the transmission axis of the polarizing element form an angle of 45°, and the transmittance of the polarizer was calculated.

Example 16

Based on the wavelength dispersion of the three-dimensional refractive index of the light-transmitting substrate d, the light-transmitting substrate and a polarizing element were disposed such that the fast axis of the light-transmitting substrate and the transmission axis of the polarizing element form an angle of 0°, and the transmittance of the polarizer was calculated.

Example 17

Based on the wavelength dispersion of the three-dimensional refractive index of the light-transmitting substrate d, the light-transmitting substrate and a polarizing element were disposed such that the fast axis of the light-transmitting substrate and the transmission axis of the polarizing element form an angle of 90°, and the transmittance of the polarizer was calculated.

Comparative Example 7

Based on the wavelength dispersion of the three-dimensional refractive index of the light-transmitting substrate d, the light-transmitting substrate and a polarizing element were disposed such that the fast axis of the light-transmitting substrate and the transmission axis of the polarizing element form an angle of 45°, and the transmittance of the polarizer was calculated.

Reference Example 1

Based on the wavelength dispersion of the three-dimensional refractive index of the light-transmitting substrate A, the transmittance of the polarizer was calculated.

Reference Example 2

Based on the wavelength dispersion of the three-dimensional refractive index of the light-transmitting substrate B, the transmittance of the polarizer was calculated.

Reference Example 3

Based on the wavelength dispersion of the three-dimensional refractive index of the light-transmitting substrate C, the transmittance of the polarizer was calculated.

Reference Example 4

Based on the wavelength dispersion of the three-dimensional refractive index of the light-transmitting substrate D, the transmittance of the polarizer was calculated.

Reference Example 5

The transmittance of the polarizer was calculated in the same manner as in Example 5, except that the incident light was randomly polarized light.

Reference Example 6

The transmittance of the polarizer was calculated in the same manner as in Example 9, except that the incident light was randomly polarized light.

Reference Example 7

The transmittance of the polarizer was calculated in the same manner as in Comparative Example 3, except that the incident light was randomly polarized light.

Reference Example 8

The transmittance of the polarizer was calculated in the same manner as in Reference Example 3, except that the incident light had a state of polarization of random light.

Table 1 shows the results of the evaluation related to examples, comparative examples, and reference examples.

Regarding the transmittance in the case where the incident light was linearly polarized light, the transmittance of the polarizer having in-plane birefringence is shown relative to the transmittance of the polarizer having no in-plane birefringence taken as 100 for each material. Regarding the transmittance in the case where the incident light was randomly polarized light, similarly, the transmittance of the polarizer having in-plane birefringence is shown relative to the transmittance of the polarizer having no in-plane birefringence taken as 100.

TABLE 1

| | Material of light-transmitting substrate | Δn | Angle between fast axis of light-transmitting substrate and transmission axis of polarizing element | Transmittance (%) |
|---|---|---|---|---|
| Example 1 | CAP | 0.001 | 0 | 100.004 |
| Example 2 | | | 90 | 99.991 |
| Comparative Example 1 | | | 45 | 80.827 |
| Example 3 | COP | 0.0014 | 0 | 100.006 |
| Example 4 | | | 90 | 99.987 |
| Comparative Example 2 | | | 45 | 67.009 |
| Example 5 | PET | 0.0995 | 0 | 100.279 |
| Example 6 | | | 2 | 100.035 |
| Example 7 | | | 30 | 62.562 |
| Example 8 | | | 60 | 61.681 |
| Example 9 | | | 90 | 98.517 |
| Comparative Example 3 | | | 45 | 49.817 |
| Example 10 | | 0.0513 | 0 | 100.279 |
| Example 11 | | | 90 | 99.425 |
| Comparative Example 4 | | | 45 | 49.565 |
| Example 12 | | 0.0499 | 0 | 100.029 |
| Example 13 | | | 90 | 99.158 |
| Comparative Example 5 | | | 45 | 49.436 |
| Example 14 | | 0.0519 | 0 | 99.944 |
| Example 15 | | | 90 | 99.068 |
| Comparative Example 6 | | | 45 | 49.393 |
| Example 16 | PEN | 0.2006 | 0 | 100.606 |
| Example 17 | | | 90 | 96.681 |
| Comparative Example 7 | | | 45 | 50.781 |
| Reference Example 1 | CAP | — | — | 100.000 |
| Reference Example 2 | COP | — | — | 100.000 |
| Reference Example 3 | PET | — | — | 100.000 |
| Reference Example 4 | PEN | — | — | 100.000 |
| Reference Example 5 | PET | 0.0995 | 0 | 100.278 |
| Reference Example 6 | | | 90 | 98.518 |
| Reference Example 7 | | | 45 | 99.398 |
| Reference Example 8 | | | — | 100.000 |

As shown in Table 1, based on the comparison between Examples 1-2 and Comparative Example 1, between Examples 3-4 and Comparative Example 2, between Examples 5-9 and Comparative Example 3, between Examples 10-11 and Comparative Example 4, between Examples 12-13 and Comparative Example 5, between Examples 14-15 and Comparative Example 6, and between Examples 16-17 and Comparative Example 7, the polarizers according to examples in which the slow axis of the light-transmitting substrate and the transmission axis of the polarizing element form an angle within a predetermined range had better light transmittance than the polarizers according to comparative examples in which the angle is not within the predetermined range.

Based on the comparison between Example 1 and Reference Example 1, between Example 3 and Reference Example 2, between Example 5, 10, and 12 and Reference Example 3, and between Example 16 and Reference Example 4, the polarizers including a light-transmitting substrate having in-plane birefringence according to the examples had better light transmittance than the polarizers including a light-transmitting substrate having no in-plane birefringence according to the reference examples.

Based on the comparison between Reference Examples 5-8 and a group including Examples 5 and 9, Comparative Example 3, and Reference Example 3, the polarizers according to the examples in which the slow axis of the light-transmitting substrate and the transmission axis of the polarizing element form an angle within a predetermined range had better light transmittance than the polarizer according to the comparative example in which the angle formed is not within the predetermined range, when the polarized light was incident thereon.

INDUSTRIAL APPLICABILITY

The polarizer of the present invention is, even in the case of including a light-transmitting substrate having in-plane birefringence, excellent in the light transmittance. Moreover, even if the polarizer of the present invention includes a conventional film of cellulose esters typified by triacetyl cellulose which have no in-plane phase difference, the polarizer imparted with birefringence has excellent transmittance and is suitably used as a polarizer disposed on a backlight source side of a liquid crystal display (LCD).

The invention claimed is:

1. An image display device comprising:
   an image display element;
   a backlight source emitting light to the image display element; and
   a polarizer disposed between the backlight source and the image display element and comprising at least a light-transmitting polyester substrate having in-plane birefringence and a polarizing element layered in said order from the backlight source side,
   the light-transmitting substrate having in-plane birefringence receiving incidence of polarized light,
   the light-transmitting substrate having in-plane birefringence and the polarizing element being layered such that a fast axis of the light-transmitting substrate having in-plane birefringence along a direction in which the substrate shows a smaller refractive index and a transmission axis of the polarizing element form an angle of 90°±30°,
   the light-transmitting substrate having in-plane birefringence exhibiting a difference (nx−ny) between the refractive indexes of 0.05 or greater, where nx represents a refractive index in the direction of the slow axis in which the substrate shows a greater refractive index, and ny represents a refractive index in the direction of the fast axis that is orthogonal to the slow axis, and
   the thickness of the substrate being 10 to 300 μm.

2. The image display device according to claim 1, wherein the light-transmitting substrate having in-plane birefringence and the polarizing element are layered such that the fast axis of the light-transmitting substrate having in-plane birefringence along a direction in which the substrate shows a smaller refractive index and the transmission axis of the polarizing element form an angle of 90°±15°.

3. The image display device according to claim 1, wherein the light-transmitting substrate having in-plane birefringence satisfies the relation of nx>N>ny, where N represents an average refractive index of the light-transmitting substrate.

4. The image display device according to claim 1, wherein a polarization separation film is provided between the backlight source and the light-transmitting substrate having in-plane birefringence.

5. The image display device of claim 1, wherein the image display element comprises a liquid crystal cell.

6. The image display device of claim 1, further comprising a second polarizer on a viewer side of the image display element.

7. The image display device according to claim 6, wherein the second polarizer comprises an upper light-transmitting substrate having in-plane birefringence and an upper polarizing element, the upper light-transmitting substrate being provided on the upper polarizing element,
   wherein the upper light-transmitting substrate having in-plane birefringence and the upper polarizing element are arranged such that a fast axis of the upper light-transmitting substrate having in-plane birefringence along a direction in which the upper light-transmitting substrate shows a smaller refractive index and a transmission axis of the upper polarizing element do not form an angle of 90°.

8. A method for producing an image display device that comprises a polarizer disposed between a backlight source and an image display element in an image display device, the polarizer including a light-transmitting polyester substrate having in-plane birefringence and a polarizing element layered in said order,
   the method comprising the step of
   layering the light-transmitting substrate having in-plane birefringence and the polarizing element such that a fast axis of the light-transmitting substrate having in-plane birefringence along a direction in which the substrate shows a smaller refractive index and a transmission axis of the polarizing element form an angle of 90°±30°,
   the light-transmitting substrate having in-plane birefringence exhibiting a difference (nx−ny) between the refractive indexes of 0.05 or greater, where nx represents a refractive index in the direction of the slow axis in which the substrate shows a greater refractive index, and ny represents a refractive index in the direction of the fast axis that is orthogonal to the slow axis, and
   the thickness of the substrate being 10 to 300 μm.

9. A method for improving the transmittance of a polarizer disposed between a backlight source and an image display element in an image display device, the polarizer comprising at least a light-transmitting polyester substrate having in-plane birefringence and a polarizing element layered in said order,
   the method comprising the step of
   layering the light-transmitting substrate having in-plane birefringence and the polarizing element such that a fast axis of the light-transmitting substrate having in-plane birefringence along a direction in which the substrate shows a smaller refractive index and a transmission axis of the polarizing element form an angle of 90°±30°, the light-transmitting substrate having in-plane birefringence exhibiting a difference (nx−ny) between the refractive indexes of 0.05 or greater, where nx represents a refractive index in the direction of the slow axis in which the substrate shows a greater refractive index, and ny represents a refractive index in the direction of the fast axis that is orthogonal to the slow axis, and
the thickness of the substrate being 10 to 300 μm.

* * * * *